Nov. 7, 1939. P. A. CADY 2,178,558
BELT
Filed Sept. 6, 1938
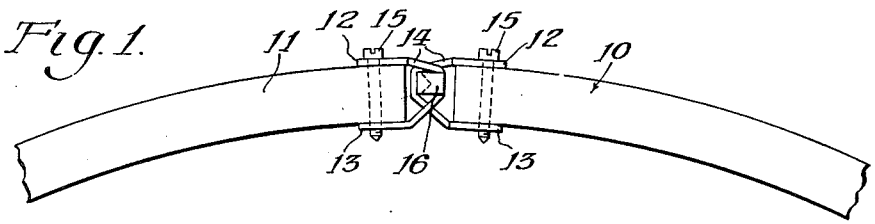
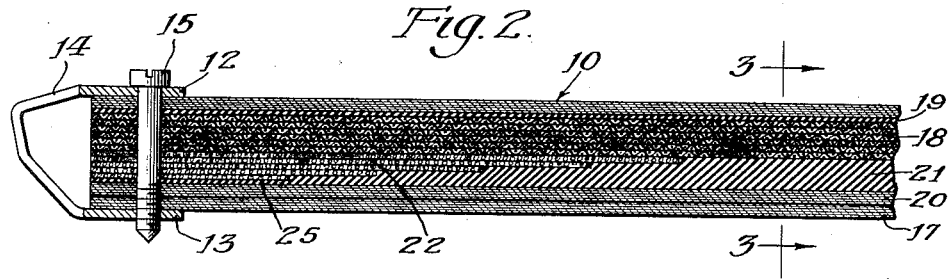
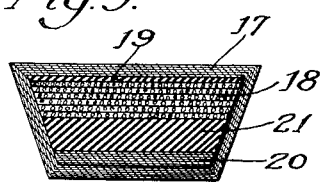
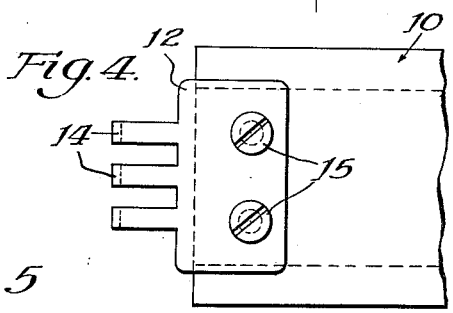
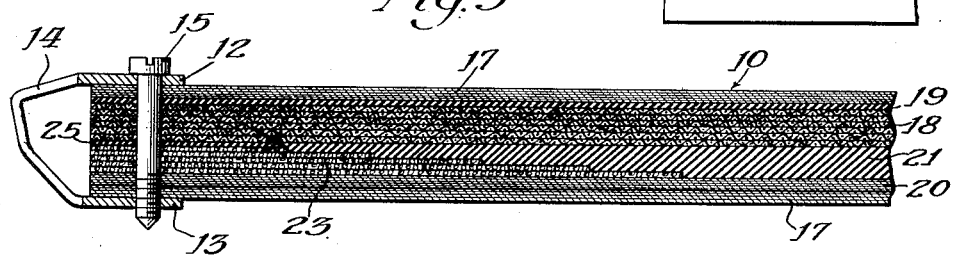
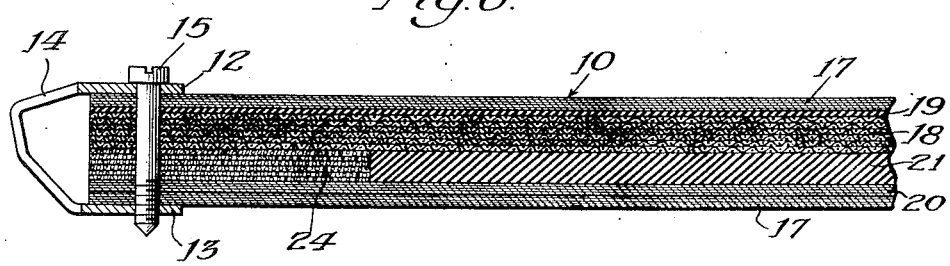
Inventor:
Pierre A. Cady,
By Lee J. Gary
Attorney.

Patented Nov. 7, 1939

2,178,558

UNITED STATES PATENT OFFICE 2,178,558

BELT

Pierre A. Cady, Passaic, N. J., assignor to Raybestos-Manhattan, Inc., Passaic, N. J., a corporation of New Jersey Application September 6, 1938, Serial No. 228,589

10 Claims. (Cl. 74—233)

This invention relates to improvements in belt construction, and particularly to a side drive or V-belt, the ends of which may be spliced together by suitable connector means, and is characterized in that the ends of the belt are formed with a reinforced construction.

Side drive or V-belts generally comprise an outer cover or envelope of fabric and rubber, and an inner core consisting of a strength member at or above the neutral axis of the belt, and generally a lower core portion of resilient elastic material. The strength member may comprise one or more layers of fibrous material such as canvas, duck, cord fabric, weftless cord fabric, or similar material bound and plied up with rubber, and the relatively elastic part may be rubber so as to allow the belt to be compressed and flexed when operating in and around a grooved pulley.

A longitudinally uniform construction of a belt of this class in substantially this manner is satisfactory when the belt is of endless construction. However, certain installations prevent the mounting of an endless belt and therefore require the ends of the belt to be spliced or coupled by suitable connector means. To properly connect the ends of a belt of this type which is subjected to heavy duty and great tension, requires a connector which is anchored through the thickness thereof and in addition may or may not exert a compressive clamping action against the top and bottom of the belt ends. Due to the necessity of connecting the belt ends in this manner, the strength member of the belt is weakened by portions of the connector means such as bolts, passing through it, and in addition proper gripping action of the clamping portion of the connector means is not possible due to the distortion of the rubber portion of the belt core. If the belt end is clamped so as to produce bulging or distortion, then the belt is subjected to a severe blow or shock every time it enters the sheave pulley, thus increasing the strain on the connector and decreasing the life of the belt.

One method of construction of the belt so that it is suitable for end connection is to displace substantially all of the rubber thickness by means of additional fibrous material, such as additional plies of duck. However, this results in undue stiffness throughout the belt and causes fatigue and ply separation with a resulting life shortening due to its flexing over the pulleys, and in addition introduces other undesirable characteristics in a belt of this type, and hinging action right back of the fastener clamping plates causing the duck to break.

The object of my invention is to provide a belt construction and particularly one suitable for a side drive belt which requires end splicing or connecting, and which combines the desirable features of the two classes of belt construction hereinbefore described, and eliminating their undesirable qualities when utilized as herein contemplated.

Thus I provide a belt which is constructed in a manner similar to conventional V-belts, that is, with a core having a strength member and a thickness of rubber extending longitudinally of the belt, but I reinforce the ends thereof, which are to be connected by suitable means, by means of additional material similar to that comprising the strength member. This reinforcing material substantially replaces the core rubber thickness at the ends of the belt through which bolts may be firmly lodged, and extends inwardly of the ends for a distance back of the portion which is clamped to the connector plates. Thus the tensile strength of the ends of the belt is increased and the stresses distributed at the point of major strain, without impairing the desirable qualities of the main body of the belt or otherwise undesirably modifying it.

Other objects relate to details of construction whereby the reinforcing end plies are arranged so as to gradually interrupt the flexing stresses at a point back in the belt so as to reduce fatigue at the hinge point and minimize concentration of stresses at the bolts or pins. Further objects relate to the arrangement of the plies of the fibrous material with respect to each other, and various other objects relating to the economies and details of construction will be apparent from a consideration of the following specification and drawing, wherein:

Fig. 1 is a fragmentary view of a side drive belt showing the ends thereof coupled by connector means.

Fig. 2 is a fragmentary longitudinal vertical section of a belt end with a connector secured to it.

Fig. 3 is a transverse section on the line 3—3 of Fig. 2.

Fig. 4 is a fragmentary plan view of a belt end and attached connector.

Fig. 5 is a view similar to Fig. 2, of modified construction.

Fig. 6 is a view similar to Fig. 2, of still another modification.

Referring to the drawing, 10 and 11 indicate the opposed ends of a belt, such as a side drive or V-belt which may be formed or molded, and is of a type suitable for heavy duty use in connection with grooved pulleys. As hereinbefore set forth this invention particularly relates to belt structures which cannot be formed and used in an endless construction due to mounting difficulties and require suitable splicing or end coupling or connecting means. As shown in Fig. 1 suitable coupling means are secured to the ends of the belt, each of the coupling means comprising a pair of opposed clamping plates 12 and 13 and outwardly extending knuckles 14. The opposed plates 12 and 13 clamp the top and bottom surfaces of the belt together by means of the pins or bolts 15 which pass through suitable openings in the clamping plates and extend through the thickness of the belt. The ends of the bolts 15 may be suitably threaded as may be the openings in the plate 13 so that the plates 12 and 13 may be securely clamped together to firmly engage the end of the belt together with the interlock obtained by means of the bolts 15. The knuckles 14 of each of the end connectors may dovetail within each other and may be interlocked by means of a suitable link pin 16. It is to be understood, however, that I make no claim as to the connector means shown and that other suitable connector means may be employed.

The general belt construction comprises an outer layer or envelope formed of a plurality of plies of square woven textile fabric 17 which may be rubberized or include layers of rubber. The core or interior of the belt comprises a strength member generally indicated as 18 and which may comprise a plurality of plies of fibrous material such as heavy woven fabric, canvas, duck, cords or cord fabric, and which may be bound together or impregnated with rubber. A suitable layer of rubber 19 may be interposed between the upper side of the strength member 18 and the belt envelope 17. The lower inner thickness of the belt may be reinforced with a plurality of plies 20 of material similar to that comprising the outer covering or envelope of the belt. The remainder of the core of the belt comprises a thickness of rubber 21 so as to give resiliency and flexibility to the belt and provide for flexibility thereof around its pulleys and for efficient operation in the grooves of the pulleys.

It will be noted that due to the use of connector means of the class herein shown, when the plates 12 and 13 are clamped together, distortion of the belt would result due to the desirable thickness of rubber so as to cause inefficient and improper riding of the belt in the grooves of the pulley with resultant ill effects both in operation and on the belt itself. It will also be noted that due to the fact that the bolts 15 extend through the thickness of the belt adjacent to its ends, a weakness of the structure would be caused if reinforcement means were not provided. It is, of course, evident that distortion may be prevented and the belt reinforced by eliminating the thickness of rubber and substituting therefor a reinforcement element. However, to construct the belt in such a reinforced manner would detract from its flexibility and resiliency which is necessary in operating in and around the pulleys and at the same time, since it would be relatively hard, would be unduly fatigued in passing around the pulleys and in a short time the plies would tend to delaminate. Thus in order to reinforce the belt at the point where reinforcement is desired and necessary, and yet without destroying the desirable and necessary features of the belt as a whole, I have provided for a partial replacement of the rubber thickness 21 from a point commencing at the ends of the belt and for a suitable distance inwardly thereof. This comprises a plurality of plies of fibrous material, which may be suitably of the class of materials used in the strength member 18 and which extend inwardly of the ends of the belt for suitable distances in various manners, as for example, those shown in Figs. 2, 5 and 6.

Referring to Fig. 2, the reinforcement means comprises a plurality of plies generally indicated at 22. These plies extend longitudinally of the belt and downwardly from the reinforcement member 18 in progressively decreasing lengths, all of the plies terminating at the outer end of the belt, so that a gradual thickness is built up toward the ends of the belt, even the lowest ply extending well inwardly of the connector bolts 15 and the ends of the plates 12 and 13. Thus a concentration of duck is provided at the connector without undue stiffening throughout the belt length and the flexing stresses are interrupted gradually at a point back in the belt from the connector bolts or pins so that the stresses are not concentrated at the bolts or pins 15. Thus by the concentration of the reinforcing plies 22 at the connector, the tensile strength at the connector point is increased and the holding ability of the connector to the belt is increased. Also, since the belt is solid at its ends it will not distort excessively when the connector belts are tightly clamped together by means of their bolts. Also, due to the progressively varying lengths of the plies of the reinforcing group 22, or their stepwise arrangement, the flexing stresses are gradually interrupted at a point back in the belt from the connector means which minimizes fatigue and reduces breaking of the plies of the strength member and the plies comprising the outer envelope.

Referring specifically to Fig. 5, a strength member generally indicated as 23 comprises a plurality of plies of fabric similar to those of the strength member 22 of Fig. 2. The plies 23 are likewise arranged in a stepwise manner, all terminating at the exterior end of the belt, but in this modification the plies extend downwardly of the strength member 18 and progressively increase in length inwardly of the end of the belt, producing effects similar to those hereinbefore described in the construction of Fig. 2.

A further modification as illustrated in Fig. 6 may comprise a reinforcing element generally comprising the plurality of plies 24. These plies extend from the ends of the belt and downwardly of the strength member 18, and may likewise be formed of materials similar thereto, but in this instance all of the plies may be of equal length extending well inwardly of the bolts 15 and the opposed clamping plates 12 and 13.

It will also be readily seen that the reinforcing members 22, 23 and 24, need not necessarily displace all of the rubber at the ends of the belt, and that there may remain a slight thickness 25 of rubber, or as great or as small a number of plies as is desired or feasible may be used in building up the various reinforcing members. Also their stepwise or progressive arrangement may be varied and that each of the layers of varying length may comprise varying numbers of the ply thicknesses. Also the character of the material comprising the reinforcing members 22, 23 and 24, may be different from that comprising the strength member 18. I may also suitably cause the material comprising the plies of the reinforcing members to be so disposed that their warp threads run longitudinally to the belt or at right angles to the belt plane, or they may cross in relation to adjacent plies.

It will also be seen that in the construction of my belt and the various modifications thereof, that the reinforcement means can be provided by either building up the belt endlessly or by building it up with open ends. Thus, when the belt is built up endlessly, for ease in manufacture, shaping or molding thereof, the reinforcing elements 22, 23 or 24 are interposed at a suitable point of the belt and are of twice the length required, and thereafter the belt is severed at the mid point of the reinforcing body or that the opposed ends are then likewise equally reinforced.

In place of rubber wherever used in the belt construction, suitable resilient elastic rubber-like materials may be used instead such as Thiokol, Perbunan, Neoprene, and the like, and therefore the word "rubber" as used in the specification and claims is to be construed broadly as comprehensive of these materials.

It is also to be understood that the term "fibrous material" as used in the claims and particularly as applied to the strength member and/or end reinforcement of the belt is intended to include materials such as woven fabric, canvas, duck, cord fabric, weftless cord fabric, and the like materials.

It will thus be seen that various modifications in the details of construction and the method thereof may be made without departing from the spirit of my invention and I therefore do not wish to be restricted to the precise details hereinabove set forth except as so limited by the appended claims.

I claim as my invention:

1. A belt having a reinforced end structure adapted to be engaged by connecting means, the said belt comprising a core formed of a plurality of plies of fibrous material and rubber, the number of said plies of fibrous material being increased adjacent the ends of the belt.

2. A belt having a reinforced end structure adapted to be engaged by connecting means, the said belt comprising a core having a thickness comprising fibrous material and a thickness of relatively soft rubber, the ply thickness of fibrous material being increased and the said thickness of rubber being decreased adjacent the ends of said belt.

3. A belt adapted to be joined endlessly by connector means secured to its ends, having a thickness comprising a plurality of plies of fibrous material and a thickness comprising relatively soft rubber, the said thickness of rubber being substantially displaced at the end portion of said belt by one or more plies of additional fibrous material extending from a point inwardly of the ends to the ends of said belt.

4. A side drive belt comprising an outer covering of rubberized woven fabric, and a core comprising a strength member formed of a plurality of plies of fibrous material adjacent the top of the belt and a resilient member formed of rubber adjacent the bottom of the belt, and end reinforcing means comprising a plurality of plies of fibrous material extending from the ends of the belt and inwardly thereof substantially displacing the said rubber member over an end length adapted to be engaged by end connector means.

5. A side drive belt comprising an outer covering of rubberized woven fabric, and a core comprising a strength member formed of a plurality of plies of fibrous material adjacent the top of the belt and a resilient member formed of rubber adjacent the bottom of the belt, and end reinforcing means comprising a plurality of plies of fibrous material extending from the ends of the belt and inwardly thereof substantially displacing the said rubber member adjacent to the belt ends and extending inwardly thereof in progressively varying lengths.

6. A side drive belt comprising an outer covering of rubberized woven fabric, and a core comprising a strength member formed of a plurality of plies of woven fabric adjacent the top of the belt and a resilient member formed of rubber adjacent the bottom of the belt, and end reinforcing means comprising a plurality of plies of woven fabric extending from the ends of the belt and inwardly thereof substantially displacing the said rubber member adjacent to the belt ends and extending inwardly thereof in progressively varying lengths, the warp threads of the plies comprising said reinforcing means extending at right angles to the warp threads of the plies comprising said strength member.

7. A side drive belt comprising an outer covering of rubberized woven fabric, and a core comprising a strength member formed of a plurality of plies of fibrous material adjacent the top of the belt and a resilient member formed of rubber adjacent the bottom of the belt, and end reinforcing means comprising a plurality of plies of woven fabric extending from the ends of the belt and inwardly thereof substantially displacing the said rubber member adjacent to the belt ends and extending inwardly thereof in progressively varying lengths, the warp threads of the adjacent plies comprising said reinforcing means being disposed at right angles to each other.

8. A V-belt adapted to be joined endlessly by connector means secured to the ends thereof, comprising an exterior envelope comprising a plurality of plies of fabric and rubber, a core extending longitudinally thereof having a strength member adjacent to the top thereof comprising fibrous material and a resilient member adjacent the bottom thereof comprising rubber, and end reinforcing means comprising a plurality of plies of fibrous material extending from the said strength member adjacent to the ends of said belt in progressively decreasing lengths all terminating at the belt ends and progressively displacing the thickness of said resilient member.

9. A V-belt adapted to be joined endlessly by connector means secured to the ends thereof, comprising an exterior envelope comprising a plurality of plies of fabric and rubber, a core extending longitudinally thereof having a strength member adjacent to the top thereof comprising fibrous material and a resilient member adjacent the bottom thereof comprising rubber, and end reinforcing means comprising a plurality of plies of fibrous material extending from the said strength member and the ends of said belt in progressively inwardly increasing lengths longitudinally through the said resilient member.

10. In a V-belt adapted to be joined endlessly by connector means secured to the ends thereof, an exterior envelope comprising a plurality of plies of woven textile fabric and rubber, a core having a strength member extending from substantially the neutral axis of the belt to adjacent the top thereof and a resilient member comprising rubber, and means reinforcing said ends and progressively replacing said rubber member comprising a plurality of plies of fibrous material extending longtudinally of said belt and downwardly of said strength member having one of their ends terminating at the ends of said belt and extending inwardly thereof in progressively varying lengths.

PIERRE A. CADY.